(12) United States Patent
Armbrecht et al.

(10) Patent No.: US 8,359,798 B2
(45) Date of Patent: Jan. 29, 2013

(54) FOUNDATION PARTICULARLY FOR A WIND TURBINE AND WIND TURBINE

(75) Inventors: Achim Armbrecht, Wardenburg (DE); André Frank, Bremen (DE)

(73) Assignee: Siemens Aktiengesellschaft, München (DE)

( * ) Notice: Subject to any disclaimer, the term of this patent is extended or adjusted under 35 U.S.C. 154(b) by 253 days.

(21) Appl. No.: 12/608,187

(22) Filed: Oct. 29, 2009

(65) Prior Publication Data

US 2010/0043318 A1    Feb. 25, 2010

(30) Foreign Application Priority Data

Nov. 3, 2008 (EP) .................................... 08019186

(51) Int. Cl.
 *E02D 27/00* (2006.01)
 *E02D 27/32* (2006.01)

(52) U.S. Cl. .......... 52/297; 52/292; 52/293.2; 52/169.9; 52/844; 52/651.01; 52/296; 52/298; 52/253; 403/229

(58) Field of Classification Search ............... 52/292, 52/293.2, 169.9, 844, 592.5, 651.01, 294–298, 52/253; 405/229; 248/346.03, 507
See application file for complete search history.

(56) References Cited

U.S. PATENT DOCUMENTS

| 4,272,929 | A | * | 6/1981 | Hanson | 52/40 |
| 5,257,489 | A | * | 11/1993 | Angelette | 52/295 |
| 5,363,610 | A | * | 11/1994 | Thomas et al. | 52/167.8 |
| 5,481,835 | A | * | 1/1996 | Bloom | 52/98 |
| 5,595,366 | A | * | 1/1997 | Cusimano et al. | 248/354.3 |
| 5,941,399 | A | * | 8/1999 | Wang | 211/187 |
| 6,176,055 | B1 | * | 1/2001 | Fu | 52/292 |
| 6,857,808 | B1 | * | 2/2005 | Sugimoto et al. | 403/41 |
| 7,160,085 | B2 | * | 1/2007 | de Roest | 416/244 R |
| 7,191,569 | B2 | * | 3/2007 | Brown | 52/293.3 |
| 7,752,845 | B2 | * | 7/2010 | Johnson | 60/645 |
| 7,805,895 | B2 | * | 10/2010 | Kristensen | 52/169.9 |
| 7,866,121 | B2 | * | 1/2011 | Polyzois et al. | 52/848 |
| 2008/0072511 | A1 | | 3/2008 | Phuly | |

FOREIGN PATENT DOCUMENTS

| DK | 174190 B1 | 9/2002 |
| EP | 1058787 B1 | 12/2000 |
| EP | 1074663 A1 | 2/2001 |
| WO | WO 99/43956 A1 | 9/1999 |
| WO | WO 2004/101898 A2 | 11/2004 |
| WO | WO 2005/012651 A1 | 2/2005 |
| WO | WO 2008/036934 A2 | 3/2008 |

OTHER PUBLICATIONS

"BONUS Wind Turbines Foundations", Foundation, Bonus Wind Turbines, BONUS Energy A/S, Mar. 21, 2002, pp. 1-4, rev 3.

* cited by examiner

*Primary Examiner* — William V Gilbert
*Assistant Examiner* — Chi Q Nguyen

(57) ABSTRACT

A foundation, particularly a foundation of a wind turbine, is provided. The foundation includes a central foundation member and a plurality of foundation segments which are segments of a circular, ring shaped or polygonal foundation element and which are connected to the central foundation member using a plurality of locking elements.

19 Claims, 3 Drawing Sheets

FOUNDATION PARTICULARLY FOR A WIND TURBINE AND WIND TURBINE

CROSS REFERENCE TO RELATED APPLICATIONS

This application claims priority of European Patent Office application No. 08019186.9 EP filed Nov. 3, 2008, which is incorporated by reference herein in its entirety.

FIELD OF THE INVENTION

The invention relates to a foundation particularly a foundation of a wind turbine and to a wind turbine.

BACKGROUND OF THE INVENTION

Wind turbines are installations with a very tall tower which typically carries a rotor, housing and an electric generator of the wind turbine on its top. Since the used towers are very large in height in order to enable the use of a rotor with a large radius or length of the rotor blades the wind turbines are very heavy. Additionally the wind turbines are of course typically installed in topographic areas in which a strong wind is quite common and therefore the construction of the wind turbines have to be that strong to withstand the forces acting on such turbines due to the strong wind with typically high wind speed.

Therefore strong foundations are necessary requirements of the construction of such wind turbines.

Such foundations are well known in the art. The article BONUS Wind Turbines, Foundations, Foundation, Bonus Wind turbines, rev. 3 pages 1 to 4, 21.03.02 discloses a gravity foundation with a concrete base plate with a central concrete plinth. Furthermore it discloses piled foundations with prefabricated piles which will be hammered to the necessary depth into the ground and foundations with piles which will be cast in situ.

The prior art document EP 1058787 B1 discloses a foundation which is assembled of essentially uniformly formed base piece segments which are made of steel and which are arranged such that the assembled piece segments create a circular steel foundation with a hole at the center of the circle.

On-shore foundations are usually created at the location of the wind turbine installation using standard concrete casting technology to cast the foundation in situ. The above mentioned document EP 1058787 B1 discloses an off-shore foundation which is not used on-shore.

The above mentioned foundations show the disadvantage that the concrete foundations are difficult to produce at the location of the wind turbine installation and that the steel foundation is not well suited for heavy on-shore wind turbine installations.

OBJECT AND SUMMARY OF THE INVENTION

It is a first object of the invention to create a foundation particularly for a wind turbine which can be produced more easily and which saves time at the location of the construction site of the wind turbine and which can be produced with higher quality.

It is a second object of the invention to provide a wind turbine with an advantageous foundation.

The first object of the invention will be solved by a foundation according to the features of the claims, the second object by a wind turbine as claimed in the claims. The depending claims contain further developments of the invention.

An inventive foundation particularly a foundation of a wind turbine comprises a central foundation member and a plurality of foundation segments which are segments of a circular, ring shaped or polygonal foundation element and which are connected to the central foundation member by means of one or more locking elements. The foundation may, in particular, be realised as a shallow foundation.

The locking elements may, e.g., be a ring shaped or polygonal projection of or a ring shaped or polygonal recess in the central foundation member together with recesses or projections of the foundation segments, respectively. The recesses or projections of the foundation segments can then engage the projection or recess in the central foundation member.

According to an embodiment of the invention the plurality of foundation segments or the foundation segments and the foundation member are joined together by means of a fixation means surrounding the segments or which is incorporated by the segments. The fixation means may, in particular, be a strap surrounding the segments, e.g., a steel band. An advantage might be to put the strap around the segments at the position of a circumferentially extending shoulder of the plurality of the segments.

With regard to another embodiment of the invention the foundation segments and the foundation member are joined together by means of concrete, grout or mortar. This allows a better connection between the segments and the member and reduces relative movement of the segments and the member respectively. Since the amount of used concrete, grout or mortar is quite low compared to the material which has to be used for an in situ cast process this process is much faster in production than the in situ process of casting the whole foundation. In a practical realisation, the foundation member is or comprises a bottom plate. Both the foundation segments and the bottom plate comprise rebars where the rebars of the foundation segments and the bottom plate overlap when the foundation segments and the bottom plate are in place at the location of the foundation. The foundation segments with the rebars and the bottom plate with the rebars are joined together by means of concrete, grout or mortar.

Furthermore it is of advantage that the foundation segments and the bottom plate are joined together by means of concrete. After hardening the joining concrete can form the foundation member together with the bottom plate. In other words, the foundation member may be not fully pre-fabricated but partly cast at the construction site while the segments are preferably pre-manufactured.

In the inventive foundation the foundation segments may comprise anchoring elements for anchoring a wind turbine tower. Alternatively, the foundation segments may comprise support elements for such anchoring elements instead anchoring elements itself.

An inventive wind turbine comprises an inventive foundation and a tower anchored at the foundation.

BRIEF DESCRIPTION OF THE DRAWINGS

The above and other features and advantages of the invention will be apparent from the following description of an exemplary embodiment of the invention with reference to the accompanying drawings, in which.

DESCRIPTION OF EMBODIMENTS

Figure 1:
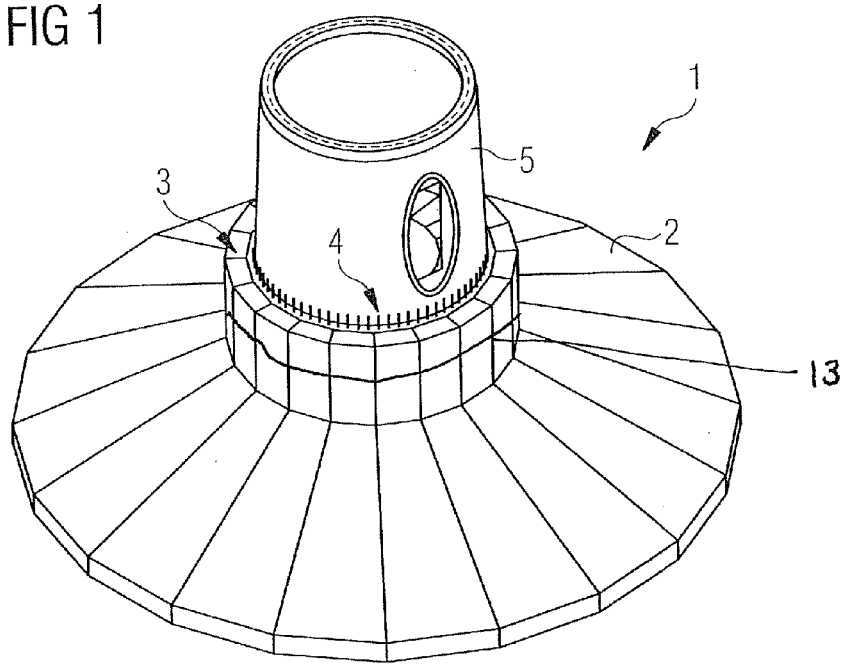
FIG. 1 shows a perspective view of a first embodiment of the inventive foundation.

FIG. 1 show a foundation 1 according to a first embodiment of the invention especially for wind turbines in a perspective view. The foundation 1 contains a plurality of foundation segments 2, which are arranged to build a circular or polygonal foundation. Each segment 2 comprises a shoulder 3 which protrudes towards the center of the foundation, i.e. towards the wind turbine, and at which fastening means 4 are provided to be used to fasten an element 5 of the wind turbine tower to the foundation 1.

The fastening means 4 are preferably bolts or anchors, especially stud bolts, to be able to fasten an element 5 of a tower of a wind turbine to the foundation 1. Since the bolts or stud bolts are integrally connected to the segments 2 of the foundation they allow the fastening of the element 5 of the tower to the circular or polygonal shaped foundation by means of nuts and screws. However, instead of providing the fastening means 4 itself at the shoulder 3 it is also possible to only provide supports for which may be part of the tower element 5 of individual elements which are neither part of the foundation segments 2 nor of the element 5.

Figure 2:
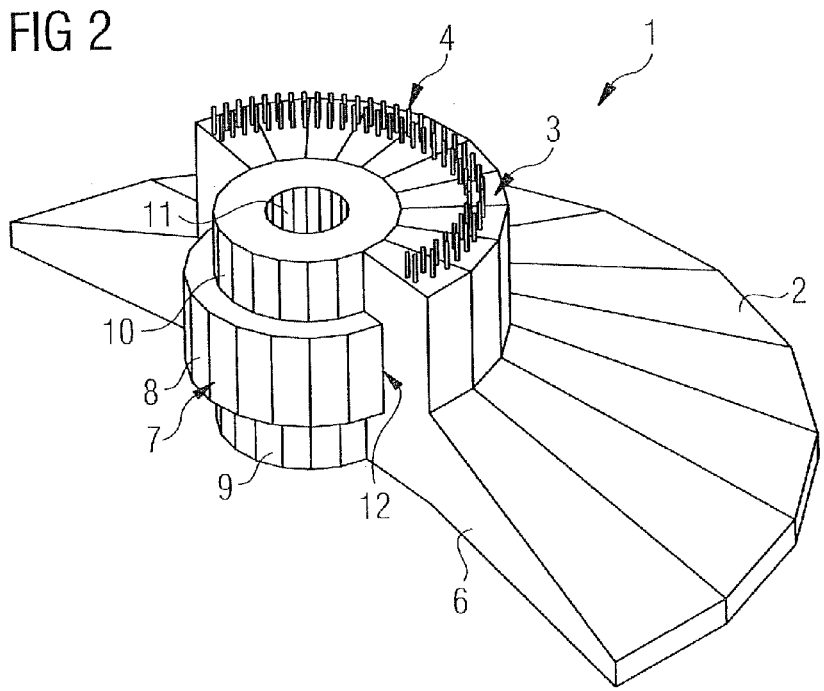
FIG. 2 shows a perspective sectional view of the first embodiment.

FIG. 2 shows a sectional view of the foundation 1 shown in FIG. 1. The sectional view allows seeing the side face 6 of the segments 2 and the central foundation member 7 in a first embodiment.

The central foundation member 7 has a central portion 8 and lateral portions 9, 10. The central portion 8 has a larger diameter or radius than the two lateral portions 9, 10. Furthermore the central foundation member has a hole 11 which is aligned in axial direction of the central foundation member 7.

The segments 2 are such that they comprise a recess 12 at the radial inner face of the shoulder 3. Therefore the side face 6 shows the recess 12. As can be seen on FIG. 2 extended portion 8 of the central foundation member 7 is located within the recess 12 of the segments 2. This allows a tight and stable connection between the segments 2 and the central foundation member 7. In other words, the central portion 8 and the recesses 12 serve as locking members to prevent tilting of the foundation segments 2 relative to the central foundation member 7.

In order to allow a tight fit between the segments 2 and the central foundation member 7 an additional concrete, grout or mortar filling 15 may appreciated. This allows filling out even small slits or grooves between them. Additionally FIG. 2 shows that the fastening means 4 are located at the upper side face of the shoulder 3 of the segments 2.

As can be seen from FIG. 1 and FIG. 2 the segments are arranged in a circular or polygonal arrangement creating a closed circle or polygonal structure. Therefore the shape of a segment looks like a piece of cake if seen from above the foundation.

The foundation 1 is an assembly of a plurality of segments and a central foundation member which are connected and fastened to build a single piece of foundation at the construction site. The creation and manufacturing of the segments at a different production site than at the construction site of the wind turbine allows the manufacturing at a less whether dependent site which may cause a higher concrete quality, a better control of the manufacturing process, a better quality control of the product and the process and a shorter construction time at the construction site, which is appreciated since this may lead to reduced costs.

Figure 3:
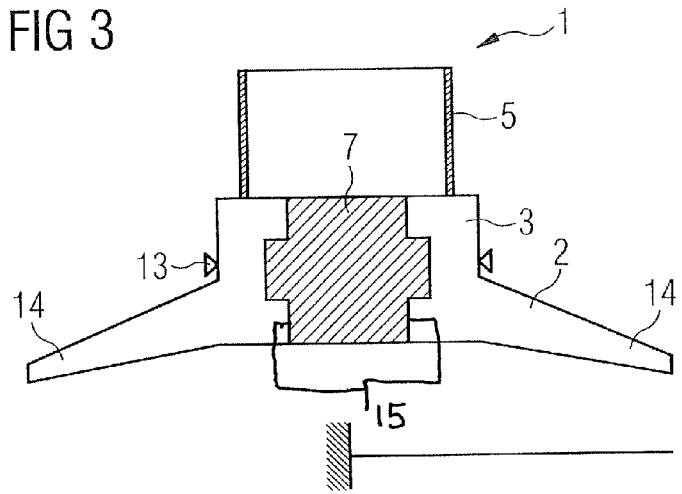
FIG. 3 shows a schematic sectional view of the first embodiment.
Figure 4:
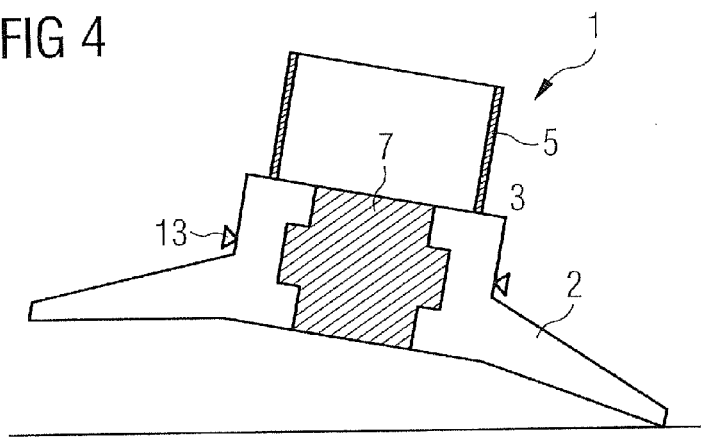
FIG. 4 shows a schematic sectional view of the first embodiment.

FIG. 3 and FIG. 4 show a foundation in a sectional view the foundation contains the segments 2 and the central foundation member 7 which are clamped together and to the central foundation member 7. Additionally it is of advantage that the segments 2 are forced together by the strap 13 which surrounds the segments e.g. at a central position e.g. at the transition point between the shoulder 3 and the radial extending wings 14 of the segments.

This allows acting against a tilting of single segments 2 such that the whole foundation has to be tilted and this is a more stable solution.

Figure 5:
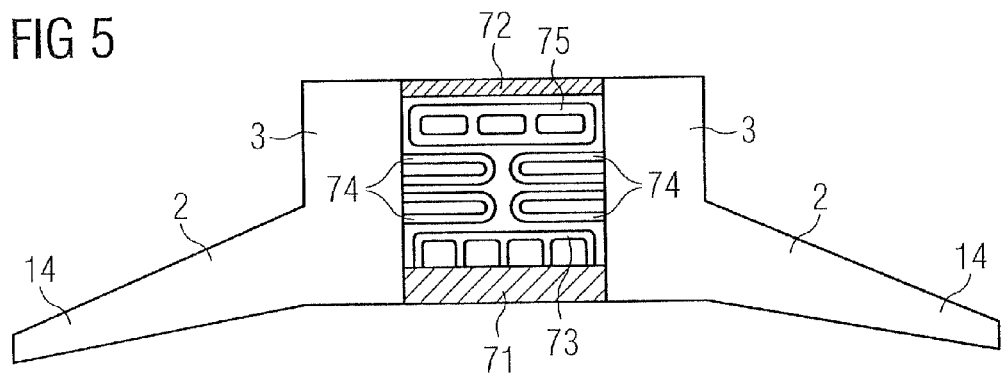
FIG. 5 shows a schematic sectional view of a second embodiment of the inventive foundation.

According to another embodiment of the invention the central foundation member 7 can be cast at the construction site while the segments 2 are pre-manufactured and pre-assembled before filling out the central space within the hole of the segments 2 arrangement. Such an embodiment is schematically shown in FIG. 5. In this embodiment, the central foundation member 7 may comprise a pre-manufactured bottom plate 71 around which the foundation segments 2 will be arranged at the construction side. The bottom plate 71 centers the segments 2 at their bottom ends. A tool 72, like e.g. a steel plate, may be used to center the segments 2 at their top ends.

Both the bottom plate 71 and the foundation segments 2 are equipped with rebars 73, 74. The rebars 74 of the segments 2 are located at their radial inner ends and project over the rebars 73 of the bottom plate 71 when the foundation segments 2 are in place. A top layer of rebars 75 may be arranged on top of the rebars 74 of the foundation segments 2 after removing the tool 72 and before filling the space between the segments 2 with concrete. The rebars 73, 74, 75 provide for good monolithic structure of the foundation 1 after the concrete is hardened. In other words, the rebars 73, 74, 75 and the hardened concrete serve as locking members to prevent tilting of the foundation segments 2 relative to the central foundation member.

Figure 6:
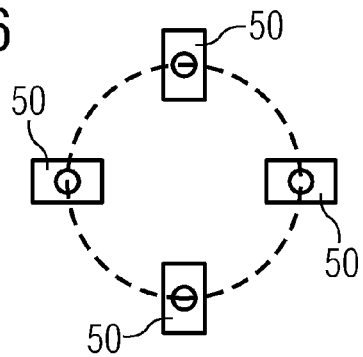
FIG. 6 shows an arrangement of foundations or foundation segments.
Figure 7:
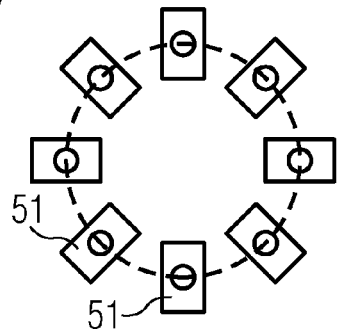
FIG. 7 shows a further arrangement of foundations or foundation segments.
Figure 8:
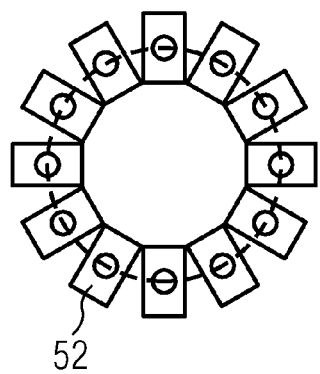
FIG. 8 shows a still further arrangement of foundations or foundation segments.
Figure 9:
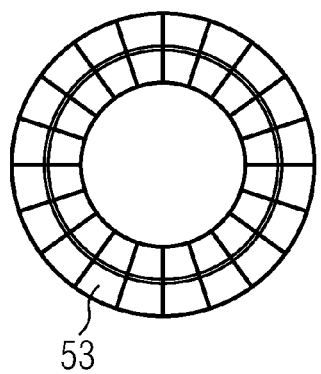
FIG. 9 shows a still further arrangement of foundations or foundation segments.

FIGS. 6 to 9 show different solutions to arrange a plurality of foundations of a tower of a wind turbine. FIG. 6 shows an arrangement of four rectangular foundations 50 which are arranged like a cross. FIG. 7 shows an arrangement of eight rectangular foundations 51 which are arranged like two crosses which are arranged with a respective angle of 45°. Such an arrangement comes already close to a circle. FIG. 8 shows an arrangement of twelve rectangular foundations 52 which are arranged like three crosses which are arranged with a respective angle of 30°. Such an arrangement is already almost like a circle. Last but not least FIG. 9 shows an arrangement of twenty foundation segments 53 having the shape like a pieces of cake and which are arranged such that they create a circle or a ring as continuous shell.

Figure 10:
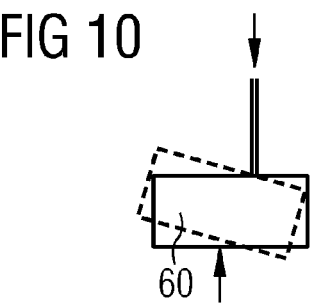
FIG. 10 shows a tilting of foundations or foundation segments.
Figure 10:
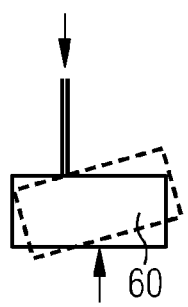
Figure 11:
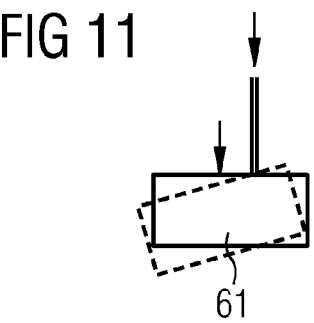
FIG. 11 shows a tilting of foundations or foundation segments.
Figure 11:
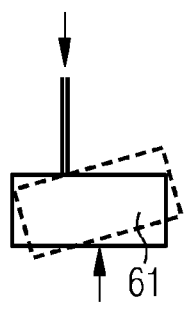

FIGS. 10 and 11 both show an effect of a tilting of foundations 60, 61 like two foundations of FIG. 6. In FIG. 10 both foundations 60 are tilted anti-parallel. This means that the tilting angle with respect to the normal axis has the same size but an opposite algebraic sign. In FIG. 11 both foundations 61 are tilted in the same direction. This means that the tilting angle with respect to the normal axis has the same size and the same algebraic sign.

This means that the foundations have to be fixed with respect to the other foundations or foundation segments. This might be done according to the first embodiment by using a fully pre-manufactured central foundation member and foundation segments forced together by the strap or according to the second embodiment by using a bottom plate, rebars and concrete which connects the bottom plate to segments and forms together with the bottom plate a central foundation member after the concrete is hardened.

The invention claimed is:

1. A foundation, comprising:
   a polygonal shaped central foundation member arranged in a ring; and
   a plurality of foundation segments which are segments of a polygonal foundation element arranged in said ring and which are connected to the central foundation member using a locking arrangement,
   wherein the locking arrangement includes a polygonal projection of the central foundation member coupled to a recess of a foundation segment so that the recess of the foundation segment engages the projection of the central foundation member resulting in a tight fit between the recess and projection with no resulting gap.

2. The foundation as claimed in claim 1, wherein the plurality of foundation segments and the central foundation member are joined together by a fixation means which surrounds the plurality of foundation segments or is incorporated by the plurality of foundation segments.

3. The foundation as claimed in claim 2, wherein the fixation means is a strap surrounding the plurality of foundation segments.

4. The foundation as claimed in claim 1, wherein the plurality of foundation segments and the central foundation member are joined together using concrete, grout or mortar.

5. The foundation as claimed in claim 4,
   wherein the central foundation member comprises a bottom plate,
   wherein the plurality of foundation segments comprise a first plurality of rebars,
   wherein the bottom plate comprises a second plurality of rebars,
   wherein the first plurality of rebars and the second plurality of rebars overlap when the plurality of foundation segments and the bottom plate are in place, and
   wherein the plurality of foundation segments and the bottom plate along with the first plurality of rebars and the second plurality of rebars are joined together by concrete, grout or mortar.

6. The foundation as claimed in claim 1, wherein the foundation is a foundation of a wind turbine.

7. The foundation as claimed in claim 6, wherein the plurality of foundation segments comprise a plurality of anchoring elements for a wind turbine tower.

8. The foundation as claimed in claim 7, wherein the plurality of anchoring elements are a plurality of bolts.

9. The foundation as claimed in claim 1, wherein the foundation is a shallow foundation.

10. The foundation as claimed in claim 1,
    wherein the central foundation member further comprises a central portion, and two lateral portions, and
    wherein central foundation member also includes a hole, aligned in an axial direction of the central foundation member.

11. A wind turbine, comprising:
    a foundation, comprising:
       a polygonal shaped central foundation member arranged in a ring, and
       a plurality of foundation segments which are segments of a circular, ring shaped or polygonal foundation element arranged in said ring and which are connected to the central foundation member using a locking arrangement; and
    a tower anchored at the foundation,
    wherein the locking arrangement includes a polygonal projection of the central foundation member coupled to a recess of a foundation segment of so that the recess of the foundation segment engages the projection of the central foundation member resulting in a tight fit between the recess and projection with no resulting gap.

12. The wind turbine as claimed in claim 11, wherein the plurality of foundation segments and the central foundation member are joined together by a fixation means which surrounds the plurality of foundation segments or is incorporated by the plurality of foundation segments.

13. The wind turbine as claimed in claim 12, wherein the fixation means is a strap surrounding the plurality of foundation segments.

14. The wind turbine as claimed in claim 11, wherein the plurality of foundation segments and the central foundation member are joined together using concrete, grout or mortar.

15. The wind turbine as claimed in claim 14,
    wherein the central foundation member comprises a bottom plate,
    wherein the plurality of foundation segments comprise a first plurality of rebars,
    wherein the bottom plate comprises a second plurality of rebars,
    wherein the first plurality of rebars and the second plurality of rebars overlap when the plurality of foundation segments and the bottom plate are in place, and
    wherein the plurality of foundation segments and the bottom plate along with the first plurality of rebars and the second plurality of rebars are joined together by concrete, grout or mortar.

16. The wind turbine as claimed in claim 11, wherein the plurality of foundation segments comprise a plurality of anchoring elements for a wind turbine tower.

17. The wind turbine as claimed in claim 11, wherein the foundation is a shallow foundation.

18. The wind turbine as claimed in claim 11,
    wherein the central foundation member further comprises a central portion, and two lateral portions, and
    wherein central foundation member also includes a hole, aligned in an axial direction of the central foundation member.

19. A foundation, comprising:
    a polygonal shaped central foundation member arranged in a ring; and
    a plurality of foundation segments which are segments of a polygonal foundation element arranged in said ring and which are connected to the central foundation member using a locking arrangement,
    wherein the locking arrangement includes a polygonal recess of the central foundation member coupled to a projection of a foundation segment so that the projection of a foundation segment engages the recess of the central foundation element resulting in a tight fit between the recess and projection with no resulting gap.

* * * * *